(12) United States Patent
Shinoda et al.

(10) Patent No.: US 10,152,042 B2
(45) Date of Patent: Dec. 11, 2018

(54) SERVOMOTOR CONTROL DEVICE, AND SERVOMOTOR CONTROL SYSTEM

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/953,861

(22) Filed: Apr. 16, 2018

(65) Prior Publication Data

US 2018/0314228 A1    Nov. 1, 2018

(30) Foreign Application Priority Data

Apr. 26, 2017   (JP) .................................. 2017-087566

(51) Int. Cl.
   *G05B 23/02*   (2006.01)
   *G05B 19/402*   (2006.01)

(52) U.S. Cl.
   CPC .. *G05B 19/402* (2013.01); *G05B 2219/37506* (2013.01)

(58) Field of Classification Search
   CPC ............... G05B 19/402; G05B 2219/37506
   USPC ....................................................... 318/565
   See application file for complete search history.

(56) References Cited

U.S. PATENT DOCUMENTS

| 4,904,915 A | * | 2/1990 | Kurakake | ............ | G05B 19/232 |
| | | | | | 318/568.22 |
| 6,515,442 B1 | * | 2/2003 | Okubo | ................... | G05B 19/19 |
| | | | | | 318/560 |
| 2003/0184251 A1 | * | 10/2003 | Oyama | ................ | G05B 13/042 |
| | | | | | 318/607 |
| 2009/0009128 A1 | * | 1/2009 | Okita | ................... | G05B 13/024 |
| | | | | | 318/619 |
| 2012/0249041 A1 | * | 10/2012 | Kuramoto | ............... | G05B 19/19 |
| | | | | | 318/561 |
| 2013/0320908 A1 | * | 12/2013 | Iwashita | ............... | G05B 11/011 |
| | | | | | 318/632 |

(Continued)

FOREIGN PATENT DOCUMENTS

| JP | 11-237920 | 8/1999 |
| JP | 11-345025 | 12/1999 |

*Primary Examiner* — Eduardo Colon Santana
*Assistant Examiner* — Gabriel Agared
(74) *Attorney, Agent, or Firm* — Wenderoth, Lind & Ponack, L.L.P.

(57) ABSTRACT

A servomotor control device includes: a servomotor, detection unit, driven body, connection mechanism, and motor control unit, in which the motor control unit includes: a force estimation section that estimates a drive force acting on the driven body at a connection part between the connection mechanism and the driven body; a correction amount generation section that generates a correction amount for correcting the position command value, based on the drive force estimated and a constant for correction; and a rigidity estimation section that gradually increases the constant for correction in a state suspending generation of the position command value, and estimates a magnitude of rigidity of the connection mechanism based on the constant for correction when a variation point occurs in behavior of rotation position information of the servomotor detected, drive force estimated, or correction amount generated.

16 Claims, 12 Drawing Sheets

(56) References Cited

U.S. PATENT DOCUMENTS

| | | | |
|---|---|---|---|
| 2014/0167672 A1* | 6/2014 | Tezuka | G05B 19/404 318/632 |
| 2014/0197770 A1* | 7/2014 | Shimoda | H02P 23/14 318/490 |
| 2017/0371315 A1* | 12/2017 | Watanabe | G05B 19/31 |

* cited by examiner

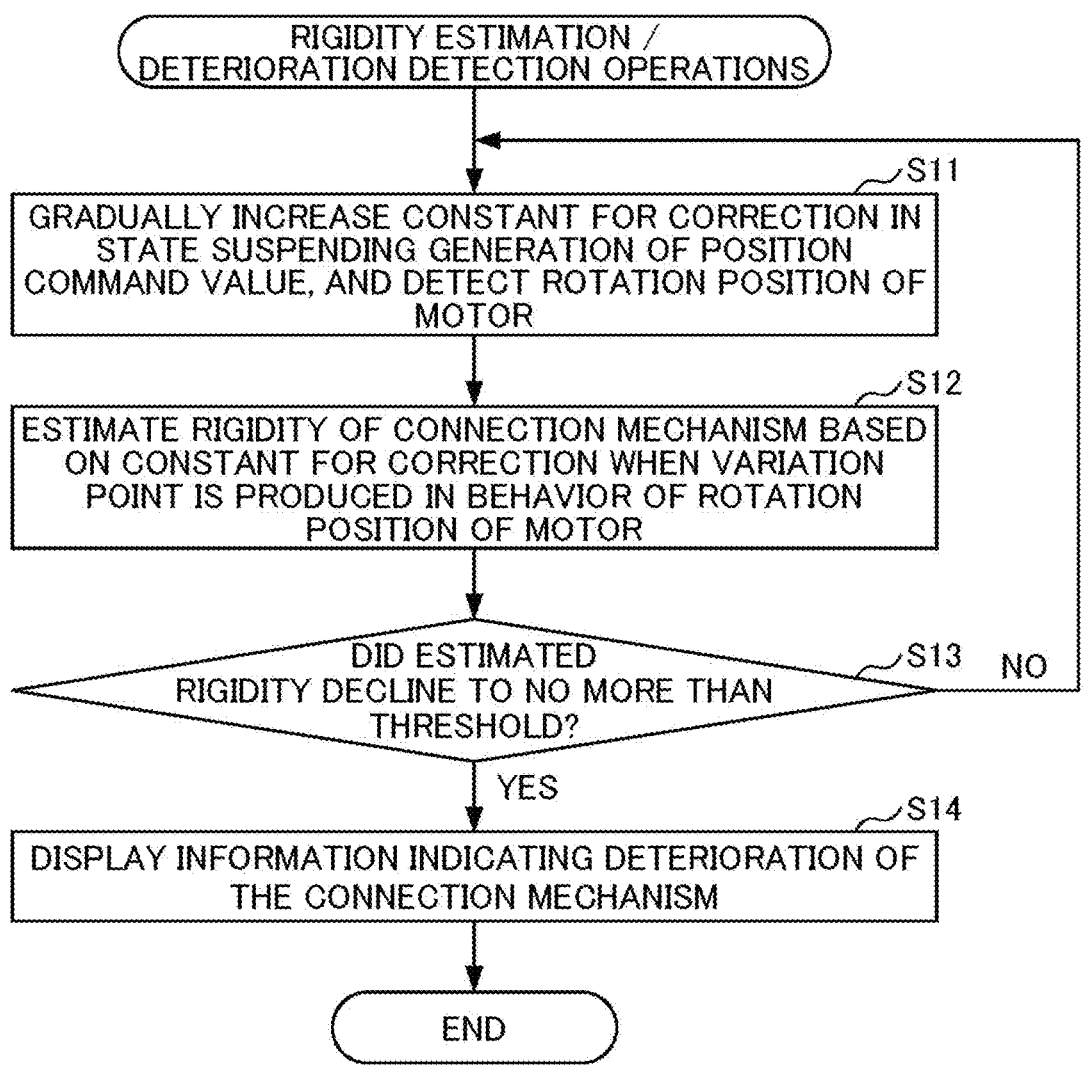

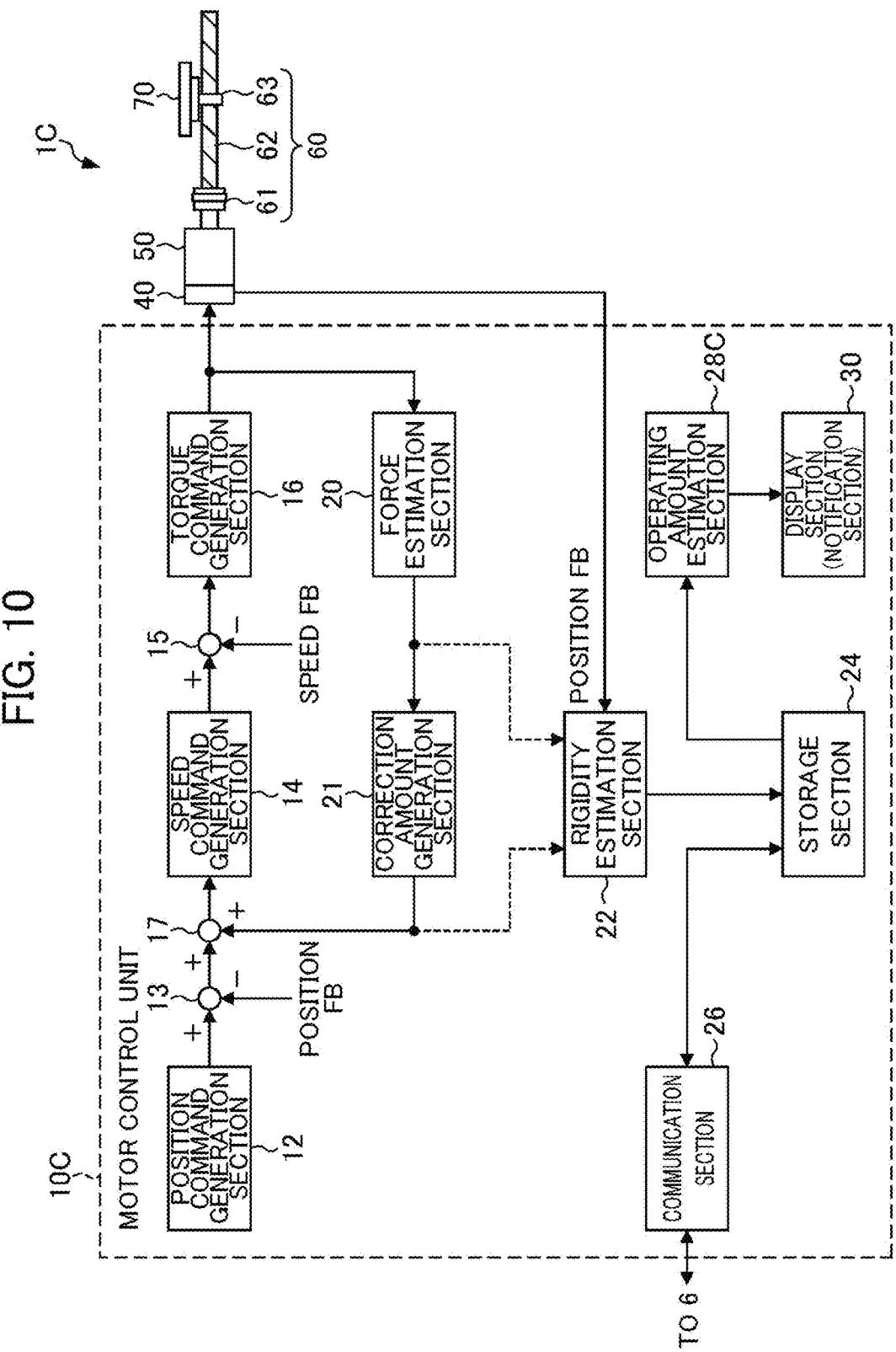

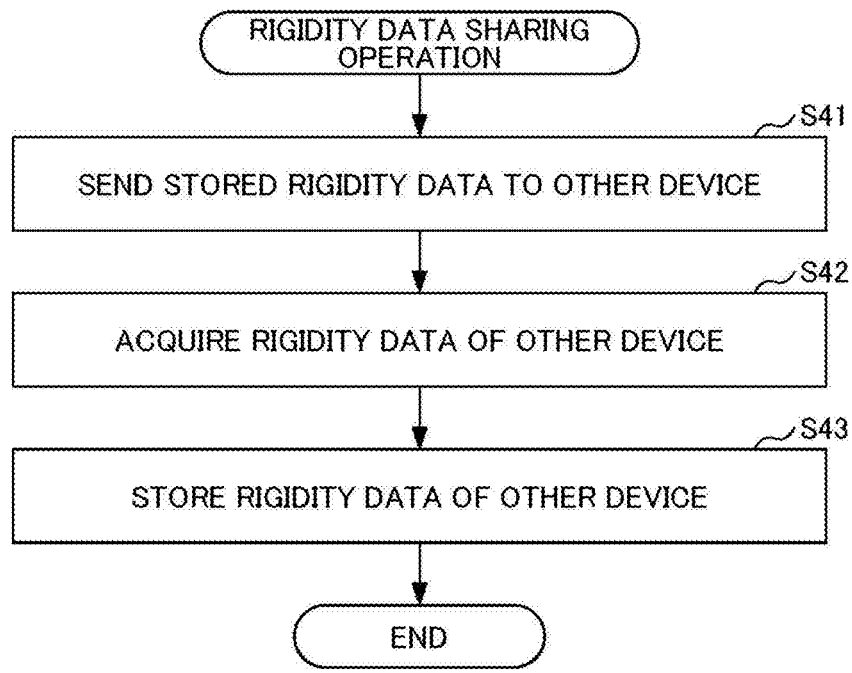
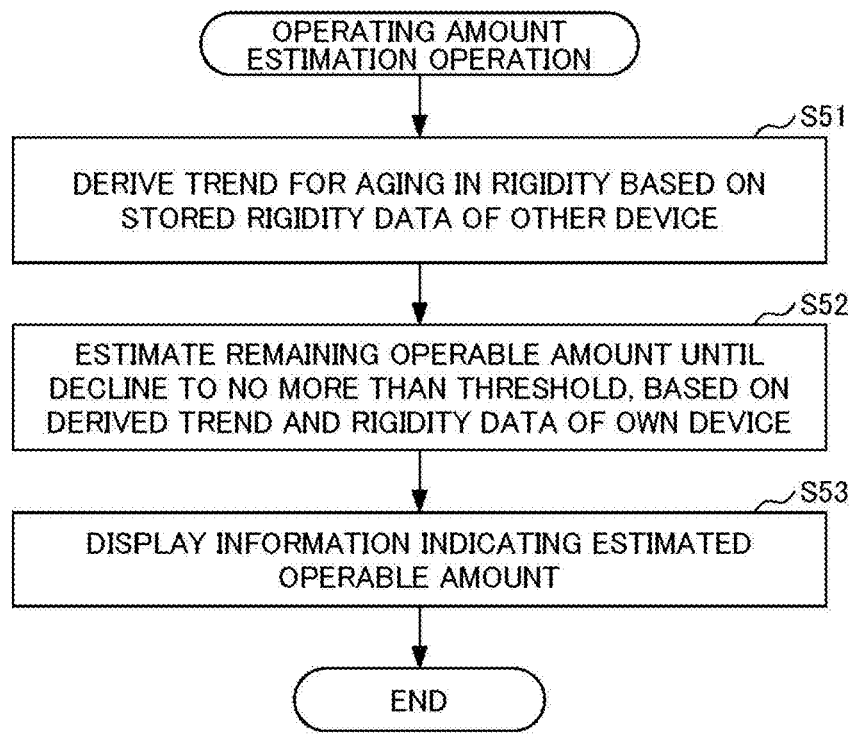

SERVOMOTOR CONTROL DEVICE, AND SERVOMOTOR CONTROL SYSTEM

This application is based on and claims the benefit of priority from Japanese Patent Application No. 2017-087566, filed on 26 Apr. 2017, the content of which is incorporated herein by reference.

BACKGROUND OF THE INVENTION

Field of the Invention

The present invention relates to a servomotor control device and servomotor control system which have a self-monitoring function for aging in the rigidity of a connection mechanism that connects a servomotor and driven body and transmits drive power of the servomotor to the driven body.

Related Art

For example, a servomotor control device has been known that controls the position of a workpiece (work) using servomotors in a machine tool or the like. The servomotor control device mounts the workpiece on a table (driven body) (also referred to as mobile body), and causes the table to move by a servomotor via the connection mechanism. The connection mechanism has a coupling connected to a servomotor, a ball screw that is fixed to the coupling, and a nut that is threaded with the ball screw, and connected to the table. When causing the ball screw to rotate by way of the servomotor, the nut threaded to the ball screw is driven in the axial direction of the ball screw, and the table connected to the nut is thereby moved.

With such a connection mechanism (particularly the coupling and ball screw), the rigidity is relatively low, and elastic deformation occurs. When the connection mechanism elastically deforms, error in the amount of elastic deformation arises in the position of the table. Concerning this point, technology for correcting the position of the table has been known.

Patent Documents 1 and 2 disclose technology for correcting positional error (positioning error) caused by aging of rigidity of the connection mechanism, based on the rotation amount of the servomotor detected by an encoder in the servomotor (semi-closed feedback value), and a movement amount of the table detected by a linear scale fixed to the table (full-closed feedback value).

Patent Document 1: Japanese Unexamined Patent Application, Publication No. H11-345025
Patent Document 2: Japanese Unexamined Patent Application, Publication No. H11-237920

SUMMARY OF THE INVENTION

However, maintenance of the connection mechanism is necessary depending on the extent of aging in rigidity of the connection mechanism. For this reason, it is necessary to grasp the aging in rigidity of the connection mechanism, i.e. magnitude of rigidity of the connection mechanism.

The present invention has an object of providing a servomotor control device and servomotor control system which estimate the magnitude of rigidity of a connection mechanism.

(1) A servomotor control device (for example, the servomotor control device 1, 1A, 1B, 1C described later) according to the present invention includes: a servomotor (for example, the servomotor 50 described later); a detection unit (for example, the encoder 40 described later) that detects a rotation position of the servomotor; a driven body (for example, the table 70 described later) that is driven by the servomotor; a connection mechanism (for example, the connection mechanism 60 described later) that connects the servomotor and the driven body to transmit power of the servomotor to the driven body; and a motor control unit (for example, the motor control unit 10, 10A, 10B, 10C described later) that controls the servomotor based on a position command value, in which the motor control unit includes: a force estimation section (for example, the force estimation section 20 described later) that estimates a drive force acting on the driven body at a connection part between the connection mechanism and the driven body; a correction amount generation section (for example, the correction amount generation section 21 described later) that generates a correction amount for correcting the position command value, based on the drive force estimated by the force estimation section and a constant for correction; and a rigidity estimation section (for example, the rigidity estimation section 22 described later) that gradually increases the constant for correction of the correction amount generation section in a state suspending generation of the position command value, and estimates a magnitude of rigidity of the connection mechanism based on the constant for correction when a variation point occurs in behavior of rotation position information of the servomotor detected by the detection unit, drive force estimated by the force estimation section, or correction amount generated by the correction amount generation section.

(2) In the motor drive device described in (1), the rigidity estimation section may define a time when a local maximum appears in the behavior of the rotation position information of the servomotor detected by the detection unit, the drive force estimated by the force estimation section, or the correction amount generated by the correction amount generation section, as the variation point.

(3) In the motor drive device described in (1), the rigidity estimation section may define when a local maximum appears in the behavior of the rotation position information of the servomotor detected by the detection unit, the drive force estimated by the force estimation section, or the correction amount generated by the correction amount generation section, and a difference between the local maximum and a value during change in the constant for correction becomes at least a predetermined value, or a predetermined multiple of a difference between the value during change in the constant for correction and a convergence value after change in the constant for correction, as the variation point; or define when a local maximum appears in the behavior of the rotation position information of the servomotor detected by the detection unit, drive force estimated by the force estimation section, or correction amount generated by the correction amount generation section, and a difference between the local maximum and a value during change in the constant for correction becomes at least a predetermined value, as the variation point.

(4) In the motor drive device described in any one of (1) to (3), the behavior may be a change with elapse of time.

(5) In the motor drive device described in any one of (1) to (4), the motor control unit may further include a deterioration detection section (for example, the deterioration detection section 28A described later) that detects deterioration of the connection mechanism based on the magnitude of rigidity estimated by the rigidity estimation section.

(6) In the servomotor control device described in (5), the deterioration detection section may detect deterioration of the connection mechanism, when the magnitude of rigidity estimated by the rigidity estimation section has declined to no more than a predetermined first threshold.

(7) In the motor drive device described in any one of (1) to (4), the motor control unit may further include: a storage section (for example, the storage section 24 described later) that stores a plurality of magnitudes of rigidity estimated by the rigidity estimation section at every predetermined time interval or indefinite time interval, as rigidity data; and a rigidity variation detection section (for example, the rigidity variation detection section 28B described later) that detects a change and variation in the rigidity of the connection mechanism, based on the rigidity data stored in the storage section.

(8) In the motor drive device described in any one of (1) to (4), the motor control unit may further include: a communication section (for example, the communication section 26 described later) that performs communication with another servomotor control device; a storage section (for example, the storage section 24 described later) that stores rigidity data of its own device in which a plurality of magnitudes of rigidity of its own device estimated by the rigidity estimation section at every predetermined time interval or indefinite time interval and operating amounts are associated, and stores rigidity data of another device, in which a plurality of magnitudes of rigidity of another device at every predetermined time interval or indefinite time internal and operating amounts are associated, acquired by the communication section; and an operating amount estimation section (for example, the operating amount estimation section 28C described later) that derives a trend for change in rigidity based on the rigidity data of another device stored in the storage section, and estimates a remaining operable amount of the connection mechanism until the magnitude of rigidity declines to no more than a predetermined second threshold, based on the trend for change in rigidity thus derived, and the rigidity data of its own device stored in the storage section.

(9) In the motor drive device described in any one of (1) to (4), the motor control unit may further include: a storage section (for example, the storage section 24 described later) that stores rigidity data of its own device in which a plurality of magnitudes of rigidity of its own device estimated by the rigidity estimation section at every predetermined time interval or indefinite time interval and operating amounts are associated, and stores in advance trend data indicating a trend for change in rigidity of the connection mechanism; and an operating amount estimation section (for example, the operating amount estimation section 28C described later) that estimates a remaining operable amount of the connection mechanism until the magnitude of rigidity declines to no more than a predetermined second threshold, based on the trend for change in rigid indicated by the trend data stored in the storage section, and the rigidity data of its own device stored in the storage section.

(10) In the motor control device described in (5) or (6), the motor control unit may further include a notification section (for example, the display section 30 described later) that notifies of information indicating the deterioration detected by the deterioration detection section.

(11) In the motor control device described in (7), the motor control unit may further include a notification section (for example, the display section 30 described later) that notifies of information indicating at least one of the change and variation in rigidity detected by the rigidity variation detection section.

(12) In the servomotor control device described in (8) or (9), the motor control unit may further include a notification section (for example, the display section 30 described later) that notifies information indicating the operable amount estimated by the operating amount estimation section.

(13) In the servomotor control device described in any one of (10) or (11), the notification section may be a display device that displays information.

(14) In the servomotor control device described in any one of (1) to (4), the motor control unit may further include: a communication section (for example, the communication section 26 described later) that sends a plurality of magnitudes of rigidity estimated by the rigidity estimation section at every predetermined time interval or indefinite time interval as rigidity data to an external storage section, and acquires the rigidity data stored in the external storage section; and a rigidity variation detection section (for example, the rigidity variation detection section 28B described later) that detects a change and variation in rigidity of the connection mechanism, based on the rigidity data acquired by the communication section from the external storage section.

(15) In the servomotor control device described in any one of (1) to (4), the motor control unit may further include: a communication section (for example, the communication section 26 described later) that sends rigidity data of its own device, in which a plurality of magnitudes of rigidity of its own device estimated by the rigidity estimation section at every predetermined time interval or indefinite time interval and operating amounts are associated, to an external storage section, and acquires the rigidity data of its own device and rigidity data of another device, in which a plurality of magnitudes of rigidity at every predetermined time interval or indefinite time interval and operating amounts are associated, stored in the external storage section; and an operating amount estimation section (for example, the operating amount estimation section 28C described later) that derives a trend for change in rigidity based on the rigidity data of another device acquired by the communication section from the external storage section, and estimates a remaining operable amount of the connection mechanism until the magnitude of rigidity declines to no more than a predetermined second threshold, based on the trend for change in rigidity thus derived and the rigidity data of its own device acquired by the communication section from the external storage section.

(16) A servomotor control system (for example, the servomotor control system 100 described later) according to the present invention includes: the servomotor control device described in (14) or (15); and a server device (for example, the server device 4 described later) that is connected to the servomotor control device and includes the external storage section.

According to the present invention, it is possible to provide a servomotor control device and servomotor control system which estimate the magnitude of rigidity of a connection mechanism.

BRIEF DESCRIPTION OF THE DRAWINGS

FIG. 3 is a flowchart showing operations of rigidity estimation and deterioration detection of a connection mechanism by way of a servomotor control device according to the first embodiment of the present invention;

FIG. 10 is a view showing the configuration of a servomotor control device according to a third embodiment of the present invention;

FIG. 11 is a flowchart showing a rigidity data sharing operation for the connection mechanism by way of the servomotor control device according to the third embodiment of the present invention;

FIG. 12 is a flowchart showing an operating amount estimation operation for the connection mechanism by way of the servomotor control device according to the third embodiment of the present invention.

DETAILED DESCRIPTION OF THE INVENTION

Hereinafter, examples of embodiments of the present invention will be explained by referencing the attached drawings. It should be noted that the same reference symbols shall be attached to identical or corresponding portions in the respective drawings.

Servomotor Control System

Figure 1:
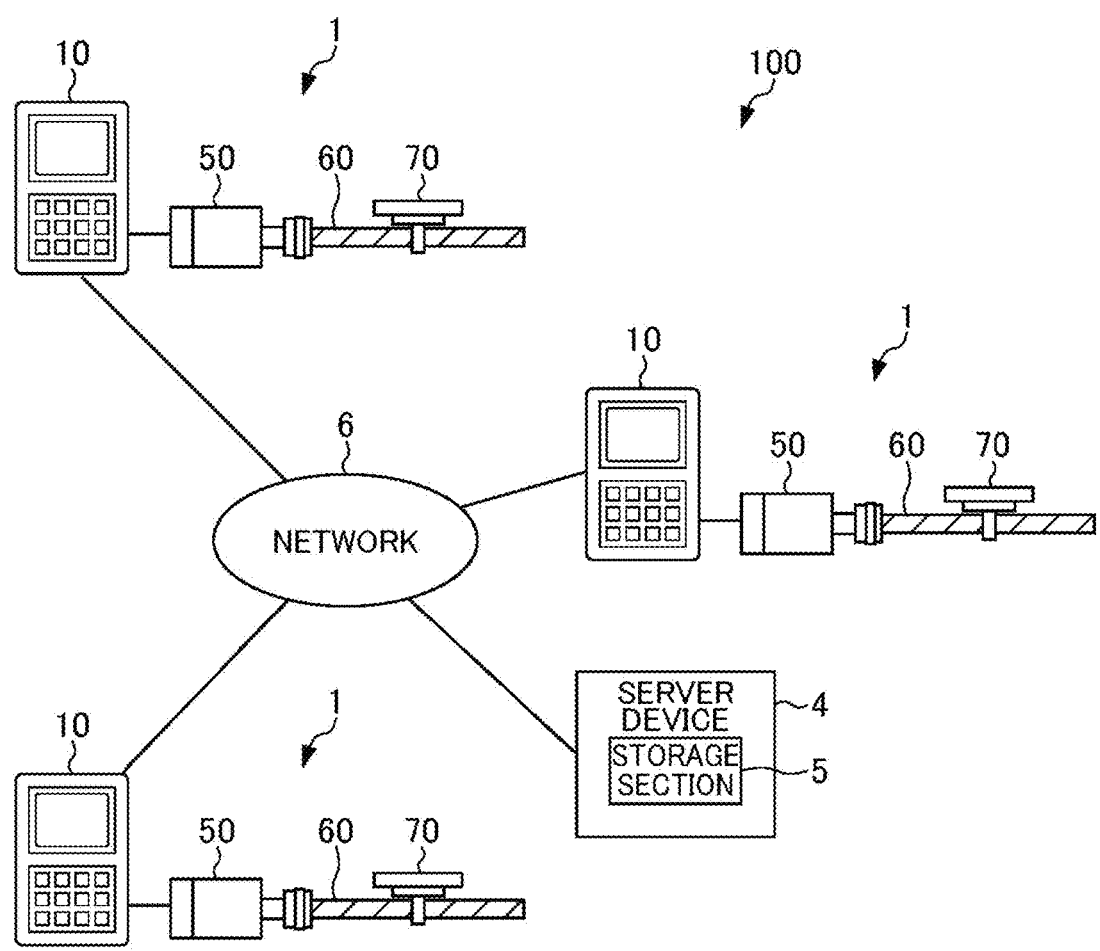
FIG. 1 is a view showing the configuration of a servomotor-control system according to an embodiment of the present invention.

FIG. 1 is a view showing the configuration of a servomotor control system according to an embodiment of the present invention. As shown in FIG. 1, in the servomotor control system 100, a plurality of servomotor control devices 1 and a server device 4 are connected via a network 6.

The servomotor control device 1 drive controls the servomotor 50 by way of the motor control unit 10, and transmits the drive power of the servomotor 50 to the table (driven body) 70 via the connection mechanism 60. In addition, the servomotor control device 1 periodically monitors the aging in rigidity of the connection mechanism 60.

The plurality of servomotor control devices 1 and the server device 4 share information related to aging in rigidity of the connection mechanism 60 monitored by the respective servomotor control devices 1, via the network 6. The plurality of servomotor control devices 1 store the shared information in a storage section (refer description later) in the motor control unit 10. The server device 4 stores the shared information in a storage section 5.

The plurality of servomotor control devices 1 are servomotor control devices for the same type of machine tool, for example, and include the same connection mechanisms 60. In addition, the plurality of servomotor control devices 1 performs the same process under the same environmental conditions.

Hereinafter, although one among the plurality of servomotor control devices 1 (hereinafter referred to as own device) will be explained, it similarly applies also for other servomotor control devices 1 (hereinafter referred to as other device). Hereinafter, three embodiments will be exemplified as the servomotor control device 1.

Servomotor Control Device of First Embodiment

Figure 2:
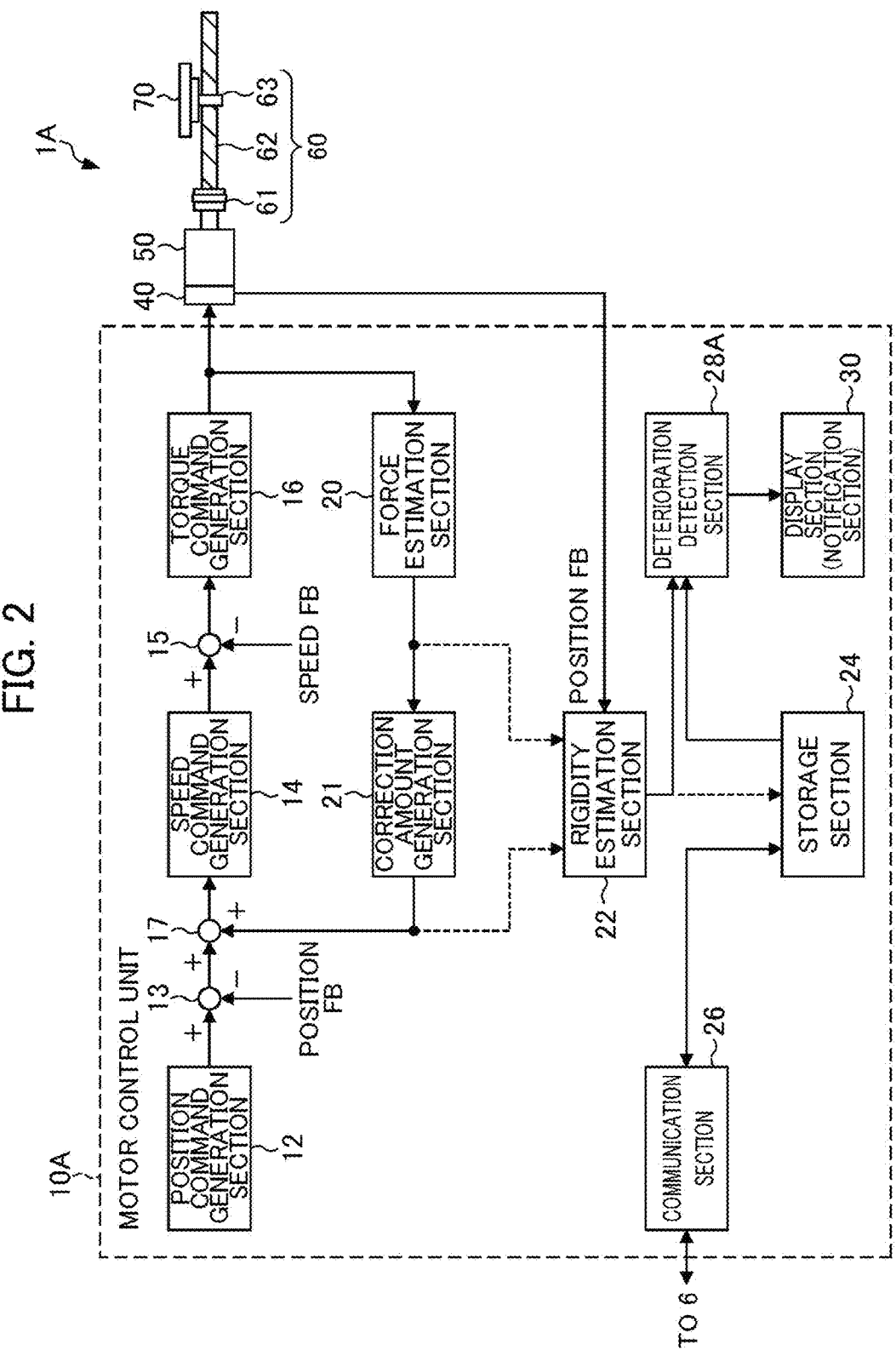
FIG. 2 is a view showing the configuration of a servomotor control device according to a first embodiment of the present invention.

FIG. 2 is a view showing the configuration of a servomotor control device according to an embodiment of the present invention. As shown in FIG. 2, a servomotor control device 1A includes a motor control unit 10A, servomotor 50, connection mechanism 60, and table (driven body) 70. The servomotor control device 1A and motor control unit 10A are examples of the servomotor control device 1 and motor control unit 10 in FIG. 1.

The servomotor control device 1A causes the table 70 to move via the connection mechanism 60 by the servomotor 50, and then processes the workpiece (work) mounted on the table 70. The connection mechanism 60 has a coupling 61 connected to the servomotor 50 and a ball screw 62 that is fixed to the coupling 61, and a nut 63 is threaded to the bail screw 62. By way of rotational driving of the servomotor 50, the nut 63 threaded to the ball screw 62 is moved in the axial direction of the ball screw 62, whereby the table 70 connected to the nut 63 is moved.

The rotation angle position of the servomotor 50 is detected by an encoder (position detection unit) 40 provided to the servomotor 50, and the detected position (rotation amount) is applied as a position feedback (position FB). Herein, since the rotation angle position of the servomotor 50 and the position of the table 70 are in a corresponding relationship, the rotation position detected by the encoder 40, i.e. position FB value, indicates the position of the table 70. It should be noted that the encoder 40 can detect rotation speed, and the detected speed is applicable as speed feedback (speed FB).

The motor control unit 10A includes a position command generation section 12, subtracters 13, 15, speed command generation section 14, torque command generation section 16, adder 17, force estimation section 20, correction amount generation section 21, rigidity estimation section 22, storage section 24, communication section 26, deterioration detection section (rigidity variation detection section) 28A, and display section (notification section) 30.

The position command generation section 12 creates a position command value for the servomotor 50, in accordance with a program and/or order inputted from a higher-order control device and/or external input device (not illustrated), or the like. The subtracter 13 obtains a difference between the position command value created by the position command generation section 12, and the position detection value detected by the encoder 40. The adder 17 obtains the sum of the difference obtained by the subtracter 13 and the correction value generated by the correction amount generation section 21, as described later. The speed command generation section 14 creates a speed command value for the servomotor 50 based on the amount of difference obtained by the subtracter 13 and corrected by the adder 17. The subtracter 15 obtains the difference between the speed command value created by the speed command generation section 14 and the speed detection value detected by the encoder 40. The torque command generation section 16 creates a torque command value for the servomotor 50 based on the amount of difference obtained by the subtracter 15.

Herein, when the servomotor 50 drives, the table 70 moves via the connection mechanism 60. At this time, elastic deformation occurring in the connection mechanism 60, then even if a case of causing the servomotor 50 to rotate according to the command value, error in the amount of the elastic formation amount will occur in the position of the table 70. In order to eliminate this error, the position command value is corrected by the elastic deformation amount of the connection mechanism 60 by the force estimation section 20, correction amount generation section 21 and adder 17. The elastic deformation amount of the connection mechanism 60 is proportional to the drive force acting on the table 70 at the connection part between the table 70 (nut 63) and the connection mechanism 60, and the drive force can be expressed by the drive torque acting on the connection part.

The force estimation section 20 estimates the drive torque (drive force) acting on the table 70 at the connection part between the table 70 (nut 63) and the connection mechanism 60, based on the torque command value from the torque command generation section 16. It should be noted that the force estimation part 20 may estimate the drive torque based on the drive current of the servomotor 50 detected using an electrical current detector, i.e. actual electrical current (actual torque).

The correction amount generation section 21 generates a correction amount for correcting the position command value generated by the position command generation section 12, based on the drive torque estimated by the force estimation section 20. More specifically, the correction amount generation section 21 obtains the correction amount according to Formula (1) below, based on the drive torque T estimated by the force estimation section 20 and the constant α of correction.

$$\text{Correction amount} = \alpha \times T \tag{1}$$

The constant α of correction includes a constant of correction for torsional elastic deformation around the rotation axis occurring in the connection mechanism 60 (coupling 61, ball screw 62), and a constant of correction for stretch/contraction elastic deformation in the axial direction.

The adder 17 adds the correction amount generated by the correction amount generation section 21 to the difference obtained by the subtracter 13. The position command value is thereby corrected by the amount of the elastic deformation amount of the connection mechanism 60.

Herein, rigidity of the connection mechanism ages (declines). For example, the rigidity of the ball screw 62 in the connection mechanism 60 declines due to the preload weakening with time. Since the machining precision of the machine tool declines when the rigidity declines, maintenance of the connection mechanism 60 is necessary. It should be noted that, in the present embodiment, the rigidity estimated by a rigidity estimation section 22 described later includes elastic deformation and the influence of play.

Therefore, the inventors of the present disclosure plan to detect the aging in rigidity of the connection mechanism 60. The inventors of the present disclosure have found that, when the correction amount by the correction amount generation section 21, i.e. correction amount calculated according to the constant α of correction, becomes greater than the actual elastic deformation amount of the connection mechanism 60, the correction amount generated from the correction amount generation section 21 is added to the position command value also during stop of the servomotor control device 1A, i.e. while suspending generation of the position command value, and variation points (local maxima) occur in the behaviors of the rotation position of the servomotor 50, drive torque estimated by the force estimation section 20, and the correction amount generated by the correction amount generation section 21 (details are described later). In the present embodiment, the magnitude of rigidity of the connection mechanism 60 is estimated, and aging in rigidity of the connection mechanism 60 is detected, by detecting the occurrence of variation points in these behaviors.

More specifically, the rigidity estimation section 22 gradually increases the correction amount generated by the correction amount generation section 21, specifically the constant α of correction, in a state suspending the generation of position command value by the position command generation section 12, and estimates the magnitude of rigidity of the connection mechanism 60, based on the constant α of correction when the variation point (maximum value) occurs in the behavior of the rotation position (position FB) of the servomotor 50 detected by the encoder 40. More specifically, the rigidity estimation section 22 estimates the inverse of the constant α of correction as the magnitude of rigidity of the connection mechanism 60.

It should be noted that the rigidity estimation section 22 may estimate the magnitude of rigidity of the connection mechanism 60 based on the constant α of correction when the variation point occurs in the behavior of the drive torque (force estimated value) estimated by the force estimation section 20 or the correction amount generated by the correction amount generation section 21, in place of the rotation amount of the servomotor 50.

In addition, not limiting to the value as is of the constant for correction, the rigidity estimation section 22 may estimate the magnitude of rigidity based on a value which is based on the constant for correction such as a value arrived at by normalizing with the constant for correction set during manufacture or delivery of the machine.

The storage section 24 stores in advance lower limit values (first threshold and second threshold) for the rigidity of the connection mechanism 60 for satisfying the specifications of machining precision, as thresholds for deterioration detection of the connection mechanism 60. The storage section 24 is rewritable memory such as EEPROM, for example.

The communication section 26 performs transmission and reception of data with other servomotor control devices 1 and servo devices 4 via the network 6. The communication section 26 is a communication interface following wired or wireless communication protocol such as LAN and WAN, or short-range communication protocol such as Bluetooth and Wi-Fi, or the like.

The deterioration detection section 28A detects deterioration (change in rigidity) of the connection mechanism 60 based on the magnitude of rigidity estimated by the rigidity estimation section 22. More specifically, the deterioration detection section 28A detects deterioration in the connection mechanism 60, when the magnitude of rigidity estimated by the rigidity estimation section 22 has decline to no more than the threshold stored in the storage section 24.

The display section 30 displays information indicating deterioration of the connection mechanism 60 detected by the deterioration detection section 28A (e.g., numerical values, text, images, etc.). The display section 30 may display information indicating the magnitude of rigidity estimated by the rigidity estimation section 22, or information indicating the constant α for correction when the variation point occurs in the behavior of the rotation position of the servomotor 50. The display section 30 is a display device such as a liquid crystal display, for example.

The motor control unit 10A (and motor control units 10B, 10C described later), for example, is configured by an arithmetic processor such as DSP (Digital Signal Processor) and FPGA (Field-Programmable Gate Array). Various functions (position command generation section 12, subtracters 13, 15, speed command generation section 14, torque command generation section 16, adder 17, force estimation section 20, correction amount generation section 21, rigidity estimation section 22, deterioration detection section 28A, and rigidity variation detection section 28B and operating amount estimation section 28C described later) of the motor control unit 10A (motor control units 10B, 10C) are realized by executing predetermined software (programs) saved in a storage section (e.g., the storage section 24). The various functions of the motor control unit 10A may be realized by cooperation between hardware and software, or may be realized by only hardware (electrical circuits).

Figure 4A:
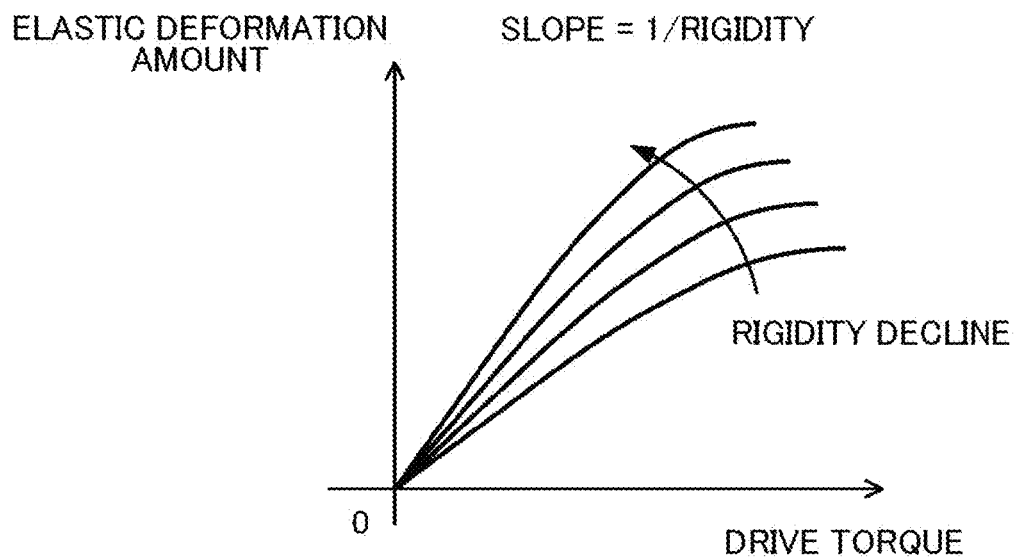
FIG. 4A is a graph showing the aging (decline) in the relationship between the elastic deformation amount and drive torque of an actual connection mechanism.
Figure 4B:
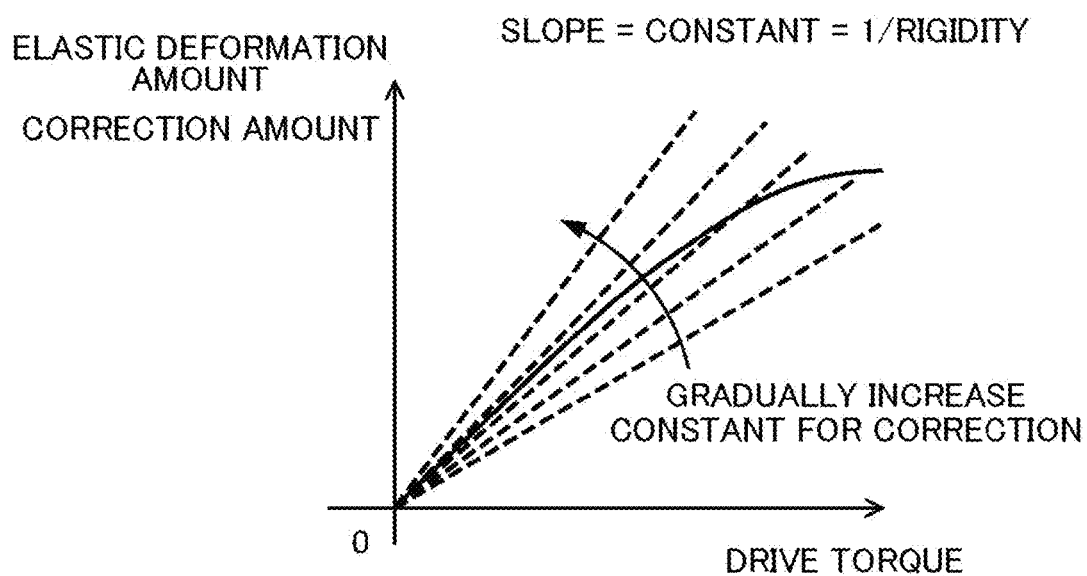
FIG. 4B is a graph showing the relationship (solid line) between the elastic deformation amount and drive torque of an actual connection mechanism; and the relationship (dotted line) between a correction amount calculated according to a constant for correction and the drive torque.
Figure 5A:
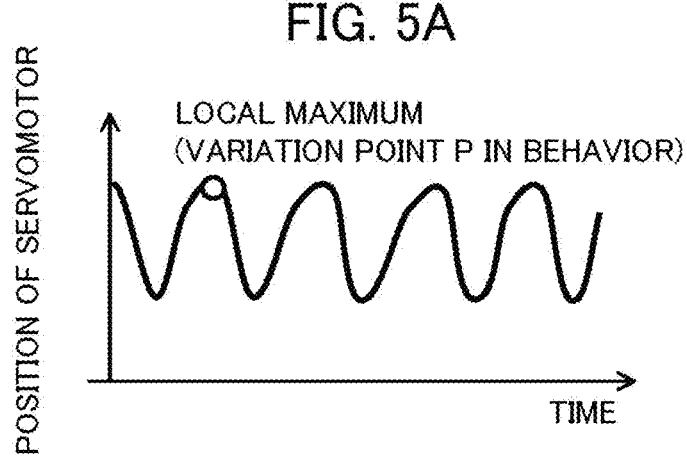
FIG. 5A is a graph showing the behaviors of the position of a servomotor 50, estimated drive torque (force estimated value), and the correction amount, when the correction amount calculated according to the constant for correction is larger than the elastic deformation amount of an actual connection mechanism, in a state suspending the position command value.
Figure 5B:
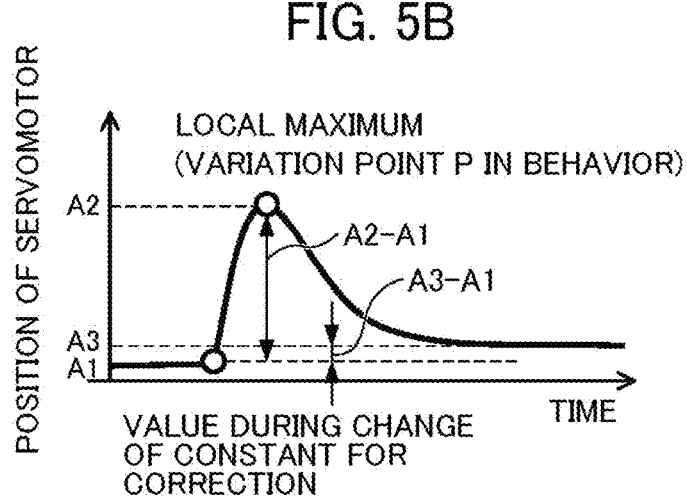
FIG. 5B is a graph showing the behaviors of the position of the servomotor 50, estimated drive torque (force estimated value), and the correction amount, at the moment when the correct amount calculated according to the constant for correction becomes larger than the elastic deformation amount of an actual connection mechanism, in a state suspending the position command value.
Figure 5C:
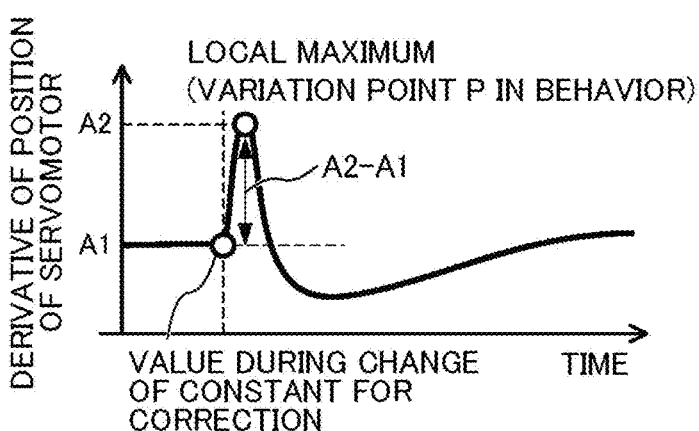
FIG. 5C is a graph showing the behaviors of the derivatives of the position of the servomotor 50, estimated drive torque (force estimated value), and the correction amount shown in FIG. 5B.

Next, the operations of rigidity estimation and deterioration detection for the connection mechanism 60 by way of the servomotor control device 1A of the first embodiment will be explained by referencing FIGS. 3 to 6D. FIG. 3 is a flowchart showing operations of rigidity estimation and deterioration detection for the connection mechanism 60 according to the servomotor control device 1A of the first embodiment. FIG. 4A is a graph showing aging (decline) in the relationship between the elastic deformation amount of an actual connection mechanism and drive torque. FIG. 4B is a graph showing the relationship between the elastic deformation amount of an actual connection mechanism and drive torque (solid line); and the relationship between the correction amount calculated according to the constant for correction and the drive torque (dotted lines). FIG. 5A is a graph showing the behaviors of the position of the servomotor 50, estimated drive torque (force estimated value) and correction amount, when the correction amount calculated according to the constant for correction is larger than the elastic deformation amount of the actual connection mechanism, in a state suspending the position command value. FIG. 5B is a graph showing the behaviors of the position of the servomotor 50, estimated drive torque (force estimated value) and correction amount, at the moment when the correction amount calculated according to the constant for correction becomes larger than the elastic deformation amount of the actual connection mechanism, in a state suspending the position command value. FIG. 5C is a graph showing the behaviors of the derivatives of the position of the servomotor 50, estimated drive torque (force estimated value) and the correction amount shown in FIG. 5B. FIGS. 6A to 6D are graphs showing experimental results for the behaviors of the rotation position of the servomotor 50, estimated drive torque and correction amount, when gradually increasing the constant for correction in a state suspending the position command value.

As mentioned above, elastic deformation occurs in the connection mechanism 60, and thus error by the amount of the elastic deformation amount occurs in the position of the table 70. In order to eliminate this error, the position command value is corrected by the amount of the elastic deformation amount of the connection mechanism 60, by way of the force estimation section 20, correction amount generation section 21 and adder 17.

The rigidity of the connection mechanism 60 ages (declines). As shown in FIG. 4A, when the rigidity of the connection mechanism 60 ages (declines), the slope of the relationship between the actual elastic deformation amount of the connection mechanism and the drive torque becomes larger. In other words, the slope of the relationship between the actual elastic deformation amount of the connection mechanism and the drive torque is in a relationship that is inversely proportional to the rigidity of the connection mechanism 60. Since the machining precision of the machine tool declines when the rigidity declines, maintenance of the connection mechanism 60 becomes necessary.

Therefore, the inventors of the present disclosure plan to detect aging of the rigidity of the connection mechanism 60. The inventors of the present disclosure have found that, when the correction amount by the correction amount generation section 21, i.e. correction amount (dotted line) calculated according to the constant α of correction as shown in FIG. 4B, becomes greater than the actual elastic deformation amount (solid line) of the connection mechanism 60 (in other words, when constant α for correction (slope of dotted line) becomes larger than the relationship (slope of solid line) between the actual elastic deformation amount of the connection mechanism and drive torque) (excessive correction), the correction amount generated from the correction amount generation section 21 is added to the position command value also during stop of the servomotor control device 1A, i.e. while suspending generation of the position command value, and as shown in FIG. 5A and FIG. 5B, a variation point P (local maxima) occurs in the behavior of the rotation position of the servomotor 50 (and drive torque estimated by the force estimation section 20, and the correction amount generated by the correction amount generation section 21). The behavior is a change in the time course.

When explaining in detail, if gradually increasing the constant α (dotted line) for correction in a state suspending the position command value as shown in FIG. 4B, when the correction amount calculated according to the constant for correction (dotted line) becomes greater than the actual elastic deformation amount of the connection mechanism (i.e. amount that should have been originally corrected in the drive torque value) (solid line), a phenomenon occurs in that the rotation position of the servomotor 50 (and estimated drive torque and correction amount) oscillates as shown in FIG. 5A. In other words, a local maximum (variation point P) appears in the behavior of the rotation position of the servomotor 50 (and estimated drive torque and correction amount).

In addition, at the moment when the correction amount calculated according to the constant for correction (dotted line) becomes larger than the actual elastic deformation amount of the connection mechanism (solid line) (vicinity of boundary between proper correction and excessive correction), a phenomenon occurs in that the rotation position of the servomotor 50 (and estimated drive torque and correction amount) suddenly increases and decreases, as shown in FIG. 5B. In other words, the local maximum (variation point F) appears in the behavior of the rotation position of the servomotor 50 (and estimated drive torque and correction amount).

In this regard, the inventors of the present disclosure have carried out experimental verification. FIGS. 6A to 6D show the experimental results for the behaviors of the rotation position of the servomotor 50, estimated drive torque and correction amount, when gradually increasing the constant α for correction.

Figure 6A:
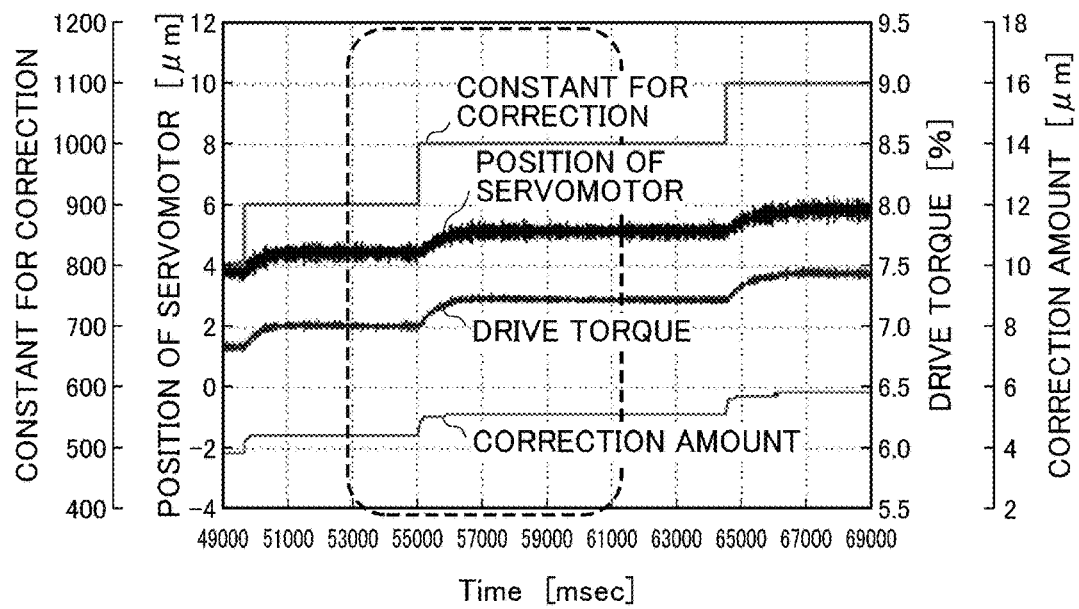
FIG. 6A is a graph showing a part of the experimental results for the behaviors of the rotation position of the servomotor, estimated drive torque and correction amount, when gradually increasing the constant for correction, in a state suspending the position command value.
Figure 6B:
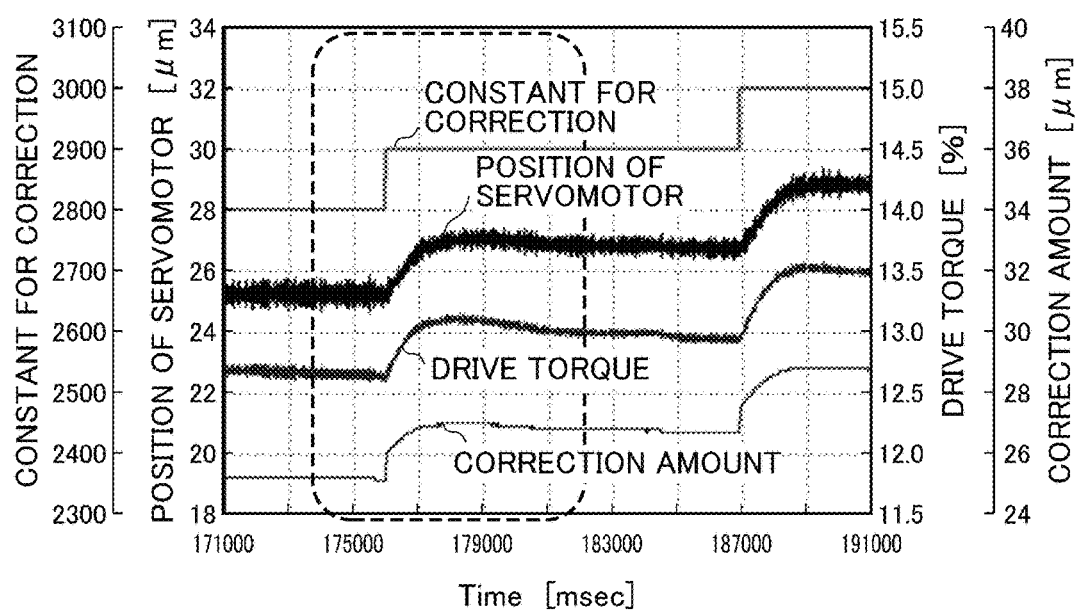
FIG. 6B is a graph showing another part of the experimental results for the behaviors of the rotation position of the servomotor, estimated drive torque and correction amount, when gradually increasing the constant for correction, in a state suspending the position command value.
Figure 6C:
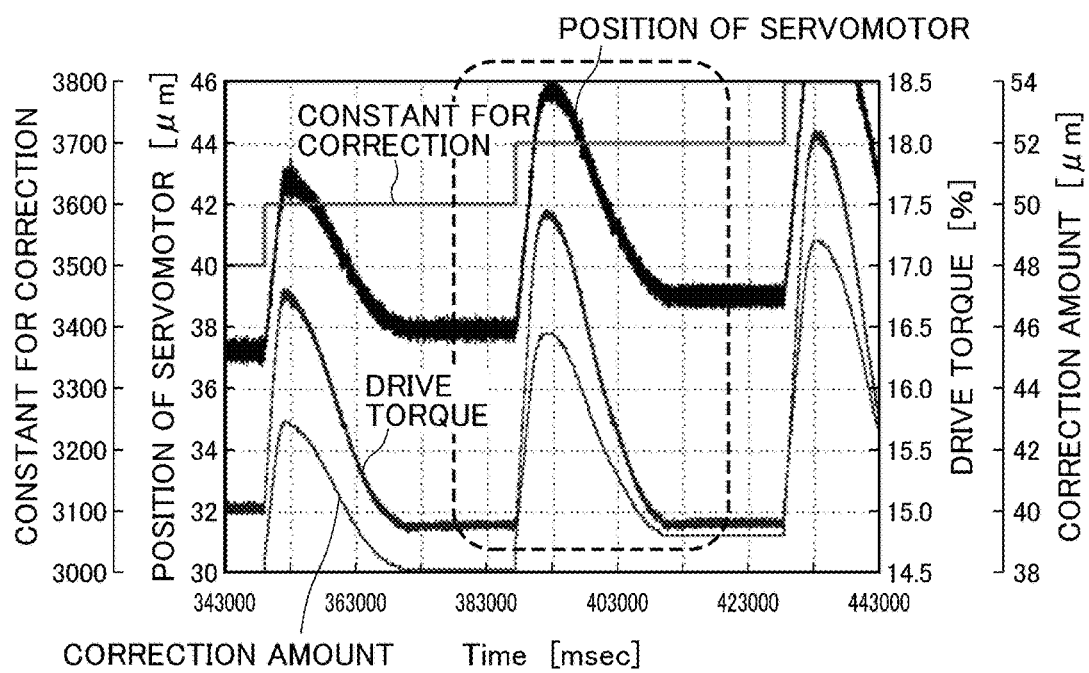
FIG. 6c is a graph showing yet another part of the experimental results for the behaviors of the rotation position of the servomotor, estimated drive torque and correction amount, when gradually increasing the constant for correction, in a state suspending the position command value.
Figure 6D:
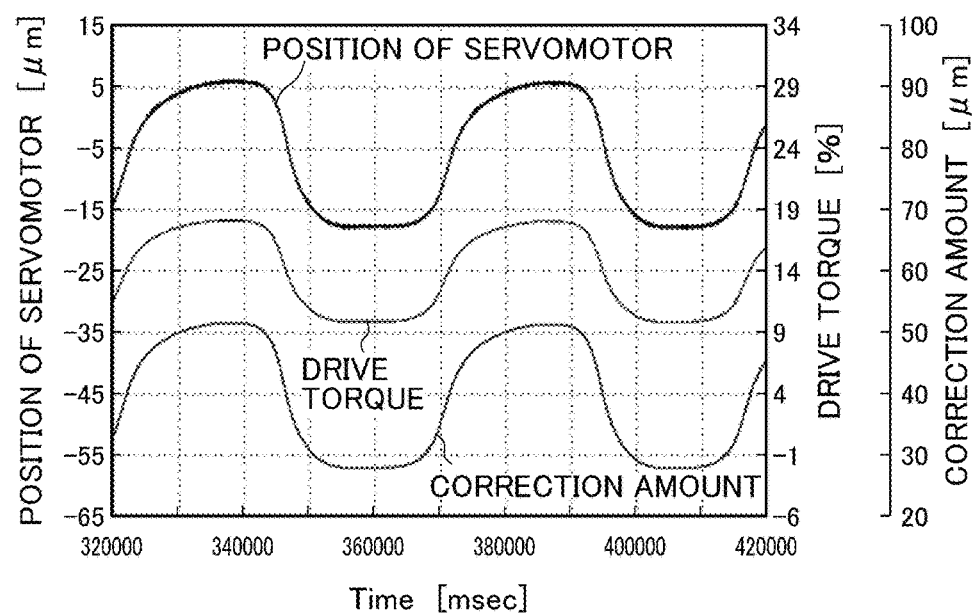
FIG. 6D is a graph further showing yet another part of the experimental results for the behaviors of the rotation position of the servomotor, estimated drive torque and correction amount, when gradually increasing the constant for correction, in a state suspending the position command value.

According to FIG. 6A and FIG. 6B, it is found that the changes in rotation position of the servomotor 50, estimated drive torque and correction amount become larger when the constant for correction changes with an increase in the constant for correction (for example, refer to inside the dotted line). In addition, according to FIG. 6C, it is found that a phenomenon occurs in that the rotation position of the servomotor 50, estimated drive torque and correction amount suddenly increase and decrease at the moment when the correction amount calculated according to the constant for correction becomes larger than the actual elastic formation amount of the connection mechanism (vicinity of boundary between proper correction and excessive correction) (for example, refer to inside dotted line). Furthermore according to FIG. 6D, it is found that a phenomenon occurs in that the rotation position of the servomotor 50, estimated drive torque and correction amount oscillate when the correction amount calculated according to the constant α for correction (dotted line) further increases (excessive correction). These phenomena are caused by becoming excessive correction upon change in correction constant.

In this way, if the correction amount calculated according to the constant for correction becomes larger than the actual elastic deformation amount of the connection mechanism, since the variation point occurs in the behaviors of the rotation position of the servomotor 50, estimated drive torque and correction amount, when gradually increasing the constant α for correction in a state suspending the position command value, it is possible to estimate the rigidity of the connection mechanism 60 based on the constant for correction when the variation point occurs or immediately prior thereto, in the rotation position of the servomotor 50, estimated rive torque and correction amount.

For example, when gradually increasing the constant α for correction in a state suspending the position command value, it is possible to estimate the inverse of the constant α for correction when or immediately prior to the rotation position of the servomotor 50, estimated drive torque or correction amount starting to oscillate as the rigidity of the connection mechanism 60.

In addition, it is possible to estimate the inverse of the constant α for correction when or immediately prior to the rotation position of the servomotor 50, estimated drive torque or correction amount suddenly increasing and decreasing as the rigidity of the connection mechanism 60.

Therefore, in Step S11, the motor control unit 10A gradually increases the constant α for correction (dotted line) of the correction amount generation section 21 as shown in FIG. 4B, in a state suspending the generation of the position command value by the position command generation section 12. When this is done, a torque command value in response to only the amount of the correction amount is supplied to the servomotor 50, and this torque command value increases in response to an increase in the correction amount.

At this time, the rotation position of the servomotor 50 is detected by the encoder 40 of the servomotor 50, and is sent to the motor control unit 10A as the position FB value. In addition, the force estimation section 20 estimates the drive torque acting on the table 70 at the connection part between the table 70 (nut 63) and connection mechanism 60, based on the torque command from the torque command generation section 16. In addition, the correction amount generation section 21 generates the correction amount according to Formula (1) above, based on the drive torque T estimated by the force estimation section 20 and the constant α for correction.

Next, in Step S12, the rigidity estimation section 22 estimates the magnitude of rigidity of the connection mechanism 60, based on the constant α for correction when the variation point occurs in the behavior of the rotation position of the servomotor 50. More specifically, the rigidity estimation section 22 estimates the inverse of the constant α for correction as the magnitude of rigidity of the connection mechanism 60.

For example, the rigidity estimation section 22 may estimate the inverse of the constant α for correction when a difference A2−A1 between a value A1 during change of the constant α for correction and a local maximum A2 becomes at least a predetermined value as shown in FIG. 5B, as the rigidity of the connection mechanism 60.

Alternatively, the rigidity estimation section 22 may estimate the inverse of the constant α for correction when the difference A2−A1 between the value A1 during change of the constant α for correction and the local maximum A2 becomes at least a predetermined multiple of the difference A3−A1 between the value A1 during change of the constant α for correction and a convergence value A3 after change of the constant α for correction, as the rigidity of the connection mechanism 60.

Alternatively, the rigidity estimation section 22 may estimate the inverse of the constant α for correction when the local maximum appears in the behavior of the derivative of the rotation position of the servomotor 50 (or estimated drive torque or correction amount), and the difference A2−A1 between the value A1 during change of the constant for correction and the local maximum A2 becomes at least a predetermined value, as the rigidity of the connection mechanism 60.

Next, in Step S13, the deterioration detection section 28A detects the deterioration of the connection mechanism 60, based on the magnitude of rigidity estimated by the rigidity estimation section 22. More specifically, the deterioration detection section 28A determines whether or not the magnitude of rigidity estimated by the rigidity estimation section 22 has declined to no more than a threshold stored in the storage section 24. Generally, a margin on the order of 20% to 30% is established in the gain of the control loop of the motor control unit 10A so as to satisfy the specifications of machining precision even if the rigidity of the connection mechanism 60 declines. The threshold is thereby set to on the order of 70% of the initial value for rigidity, for example.

In Step S13, in the case of the magnitude of rigidity having declined to no more than the threshold, the deterioration detection section 28A detects deterioration of the connection mechanism 60. At this time, in Step S14, the display section 30 displays information indicating deterioration of the connection mechanism 60.

On the other hand, in Step S13, in the case of the magnitude of rigidity being greater than the threshold, the motor control unit 10A returns to Step S11 after a predetermined time elapse, and repeats the aforementioned operation. It should be noted that the motor control unit 10A is not limited to after a fixed time (predetermined time) elapse set in advance, and may repeat the aforementioned operation after an irregular time elapse (at indefinite time intervals).

It should be noted that, in Step S12, the rigidity estimation section 22 may store the estimated magnitude of rigidity in the storage section 24. In addition, in Step S13, the deterioration detection section 28A may detect deterioration of the connection mechanism 60, based on the latest magnitude of rigidity stored in the storage section 24.

As explained above, with the servomotor control device 1A of the present embodiment, the rigidity estimation section 22 can gradually increasing the constant for correction of the correction amount generation section 21 in a state suspending generation of the position command value, and estimate the magnitude of rigidity of the connection mechanism 60, based on the constant for correction when the variation point occurs in the behavior of the rotation position of the servomotor 50.

If the rigidity of the connection mechanism 60 declines, since the constant for correction when the variation point occurs in the behavior of the rotation position of the servomotor 50 will increase, it is possible to detect variation (decline, deterioration) in the rigidity according to the magnitude of rigidity estimated based on the constant for correction at this time.

In addition, in a state in which the connection mechanism 60 is connected to the servomotor 50, it is possible to detect the change (deterioration) in rigidity of the connection mechanism 60. In addition, it is possible to detect the change in rigidity of the connection mechanism 60 using only the data measured from the servomotor 50. So long as not during machining, data measurement is possible without limitations.

In addition, with the servomotor control device 1A of the present embodiment, since the deterioration detection section 28A detects deterioration of the connection mechanism 60 based on the magnitude of rigidity estimated by the rigidity estimation section 22, it is possible to confirm the existence of the necessity for maintenance of the connection mechanism 60.

In addition, with the servomotor control device 1A of the present embodiment, since the display section 30 displays information indicating deterioration of the connection mechanism 60, it is possible for a user to confirm the existence of the necessity for maintenance of the connection mechanism 60.

It should be noted that the servomotor control device 1A of the present embodiment, since being a form that performs deterioration detection of the connection mechanism 60 with only the information of its own machine, can perform deterioration detection even if not connected to a network. In this case, the motor control unit 10A of the servomotor control device 1A does not need to include the communication section 26 shown in FIG. 2.

Servomotor Control Device according to Second Embodiment

In the first embodiment, deterioration of the connection mechanism 60 is detected every time estimating the magnitude of rigidity in its own device. In the second embodiment, the magnitude of rigidity of its own device is estimated every predetermined time interval or indefinite time interval, this plurality of magnitudes of rigidity is stored as rigidity data, and the aging (change) (decline) in rigidity and variation thereof (amount of change) (amount of decline) is detected based on the stored rigidity data.

Figure 7:
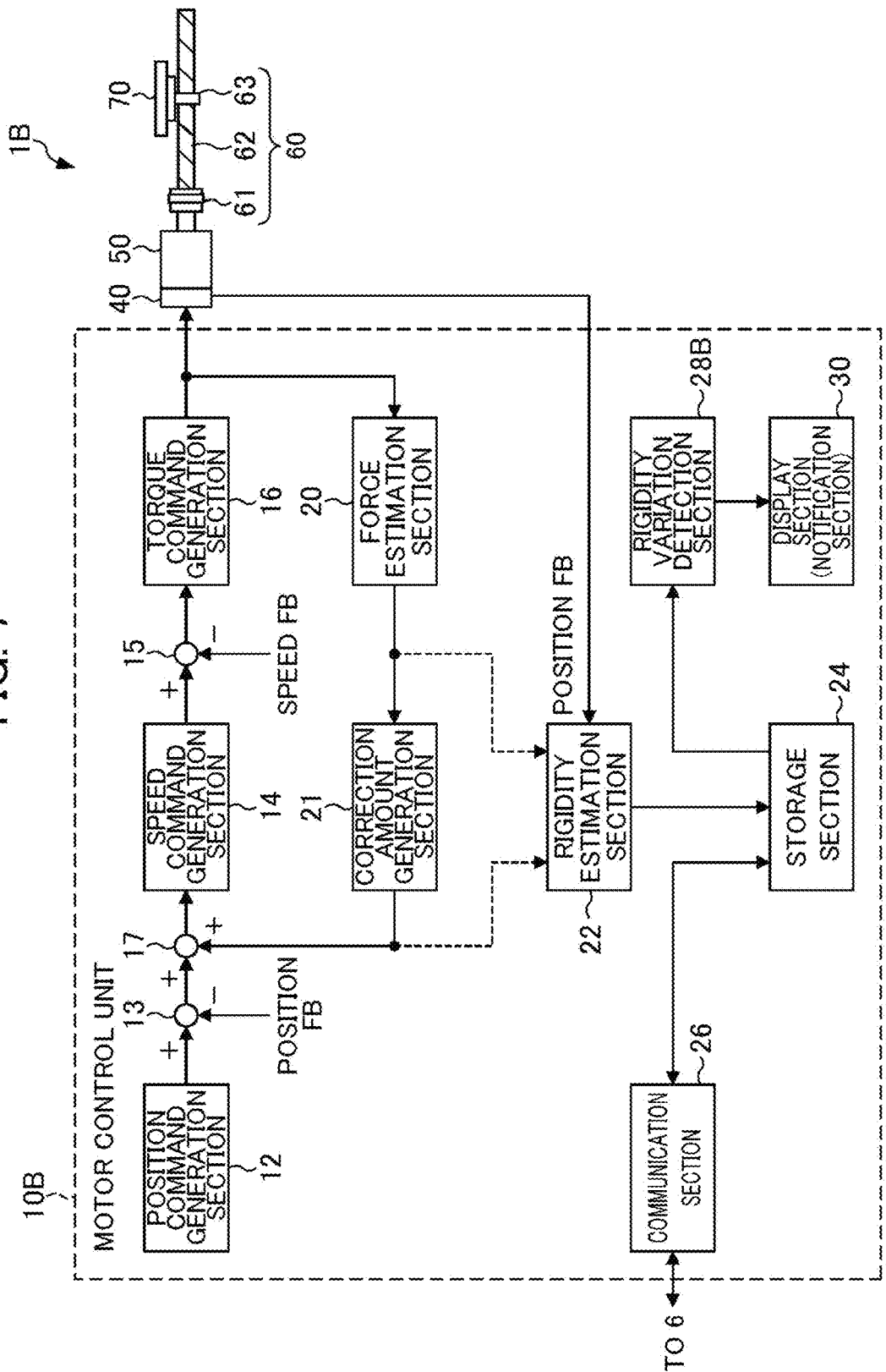
FIG. 7 is a view showing the configuration of a servomotor control device according to a second embodiment of the present invention.

FIG. 7 is a view showing the configuration of the servomotor control device according to the second embodiment of the present invention. A servomotor control device 1B of the second embodiment shown in FIG. 7 differs from the first embodiment in the point of including a motor control unit 10B in place of the motor control unit 10A of the servomotor control device 1A shown in FIG. 2. In addition, the motor control unit 10B differs from the first embodiment, in the point of including a rigidity variation detection section 28B in place of the deterioration detection section 28A of the motor control unit 10A shown in FIG. 2. It should be noted that the servomotor control device 1B and motor control unit 10B are examples of the servomotor control device 1 and motor control unit 10 of FIG. 1.

The storage section 24 stores a plurality of magnitudes of rigidity of its own device estimated by the rigidity estimation section 22 at every predetermined time interval to be associated with the operating amounts (e.g., hours) at this time as rigidity data. It should be noted that the storage section 24 is not limited to every fixed time interval set in advance (predetermined time interval), and may store the plurality of magnitudes of rigidity of its own device at every irregular time interval (indefinite time interval) to be associated with the operating amounts (e.g., time) at this time as rigidity data.

The rigidity variation detection section 28B detects an aging (change) (decline) in rigidity of the connection mechanism 60 and variation thereof (amount of decline) based on the rigidity data stored in the storage section 24.

The display section 30 displays information indicating the aging (change) (decline) in rigidity of the connection mechanism 60 detected by the rigidity variation detection section 28B, and the variation thereof (amount of decline).

Figure 8:
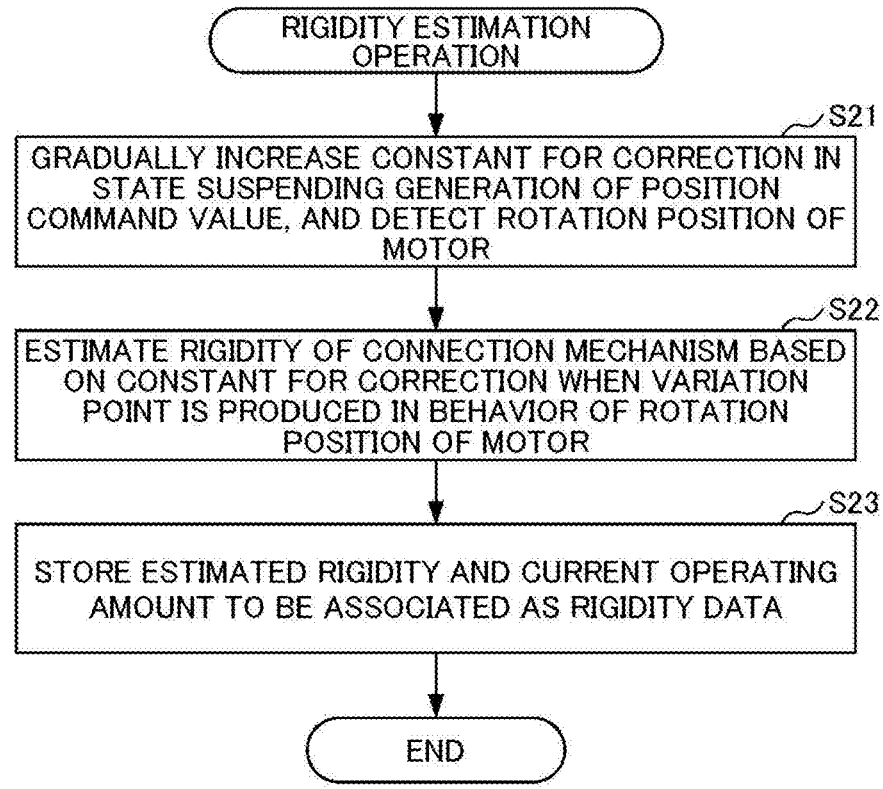
FIG. 8 is a flowchart showing a rigidity estimation operation for the connection mechanism by way of the servomotor control device according to the second embodiment of the present invention.
Figure 9:
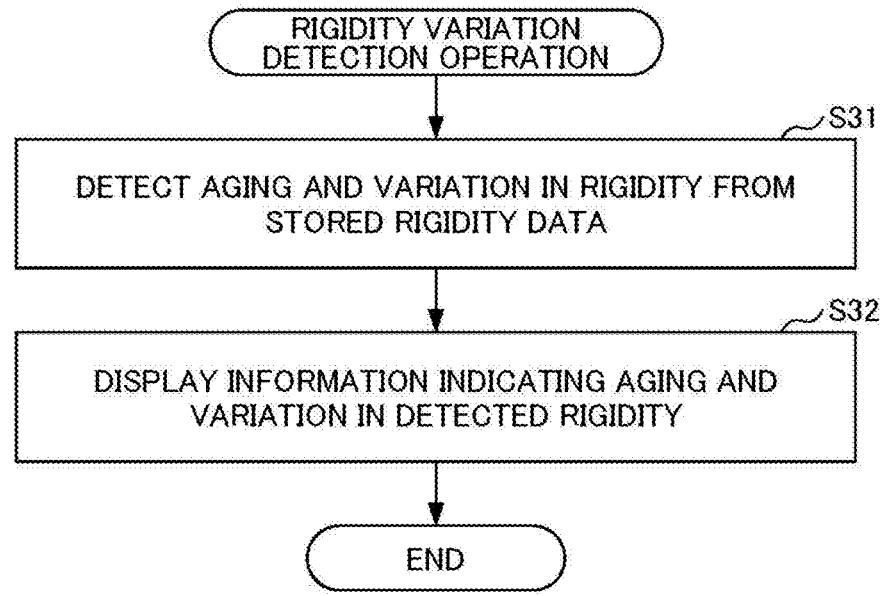
FIG. 9 is a flowchart showing a rigidity variation detection operation for the connection mechanism by way of the servomotor control device according to the second embodiment of the present invention.

Next, the rigidity estimation operation and rigidity variation detection operation for the connection mechanism 60 by way of the servomotor control device 1B of the second embodiment will be explained by referencing FIG. 8 and FIG. 9. FIG. 8 is a flowchart showing the rigidity estimation operation for the connection mechanism 60 by way of the servomotor control device 1B of the second embodiment, and FIG. 9 is a flowchart showing the rigidity variation detection operation for the connection mechanism 60 by way of the servomotor control device 1B of the second embodiment.

Rigidity Estimation Operation

First, in Step S21 of FIG. 8, similarly to Step S11 in the aforementioned FIG. 3, the motor control unit 10B gradually increases the constant α (dotted line) for correction of the correction amount generation section 21, as shown in FIG. 4B, in a state suspending the generation of the position command value by way of the position command generation section 12. At this time, the rotation position of the servomotor 50 is detected by the encoder 40 of the servomotor 50, and is sent to the motor control unit 10A as the position FB value. In addition, the force estimation section 20 estimates the drive torque acting on the table 70, at the connection part between the table 70 (nut 63) and connection mechanism 60, based on the torque command from the torque command generation section 16. In addition, the correction amount generation section 21 generates the correction amount according to Formula (1) above, based on the drive torque T estimated by the force estimation. section 20 and the constant α for correction.

Next, in Step S22, similarly to Step S12 in the aforementioned FIG. 3, the rigidity estimation. section 22 estimates the magnitude of rigidity of the connection mechanism 60, based on the constant α for correction when the variation point occurs in the behavior of the rotation position of the servomotor. More specifically, the rigidity estimation section 22 estimates the inverse of the constant α for correction as the magnitude of rigidity of the connection mechanism 60.

Next, in Step S23, the rigidity estimation section 22 stores the estimated magnitude of rigidity in the storage section 24 to be associated with the current operating amount as rigidity data.

The motor control unit 10B repeats the aforementioned operations of Steps S21 to S23 at every predetermined time interval. The rigidity data in which a plurality of magnitudes of rigidity estimated at every predetermined time interval and the operating amounts are associated is thereby stored in the storage section 24. It should be noted that the motor control unit 10B may repeat the aforementioned operations of Steps 521 to S23 at every irregular time interval (indefinite time intervals). In this case, the rigidity data in which a plurality of magnitudes of rigidity estimated at every irregular time interval (indefinite time interval) and the operating amounts are associated is stored in the storage section 24.

Rigidity Variation Detection Operation

In Step S31 of FIG. 9, the rigidity variation detection section 28B detects aging (change) (decline) in rigidity of the connection mechanism 60 and the variation thereof (amount of decline), based on the rigidity data stored in the storage section 24.

Next, in Step S32, the display section 30 displays information indicating the aging (change) (decline) in rigidity and variation thereof (amount of decline) detected by the rigidity variation detection section 28B.

Also with the servomotor control device 1B of the present embodiment, the rigidity estimation section 22 gradually increases the constant for correction of the correction amount generation section 21 in a state suspending the generation of the position command value, whereby it can estimate the magnitude of rigidity of the connection mechanism 60, based on the constant for correction when the variation point occurs in the behavior of the rotation position of the servomotor 50.

In addition, with the servomotor control device 1B of the present embodiment, the rigidity variation detection section 28B detects the aging (change) (decline) in rigidity of the connection mechanism 60 and the variation thereof (amount of decline), based on the rigidity data stored in the storage section 24, which includes a plurality of magnitudes of rigidity estimated by the rigidity estimation section 22 at every predetermined time interval or indefinite time interval; therefore, it is possible to confirm the existence of the necessity for maintenance of the connection mechanism 60.

In addition, with the servomotor control device 1B of the present embodiment, since the display section 30 displays information indicating the aging (change) (decline) in rigidity of the connection mechanism 60 and variation thereof (amount of decline), the user can confirm the existence of the necessity for maintenance of the connection mechanism.

It should be noted that the servomotor control device 1B of the present embodiment, due to being a form that performs rigidity variation detection of the connection mechanism 60 with only information of its own device, can perform rigidity variation detection even if not connected to a network. in this case, the motor control unit 10B of the servomotor control device 1B does not need to include the communication section 26 shown in FIG. 7.

In addition, the servomotor control device 1B of the present embodiment may store rigidity data in a storage section 5 of an external server device 4. In this case, in the rigidity estimation operation of FIG. 8, the rigidity data in which a plurality of magnitudes of rigidity estimated by the rigidity estimation section 22 at every predetermined time interval or indefinite time interval and the operating amounts are associated is sent to the storage section 5 of the server device 4 via a network 6 by way of the communication section 26, and is stored in the storage section 5. Then, in the rigidity variation detection operation of FIG. 9, the rigidity data is acquired from the storage section 5 of the server device 4 via the network 6 by the communication section 26, and the rigidity variation detection section 28B detects an aging (change) and variation in the rigidity of the connection mechanism 60, based on the acquired rigidity data.

Servomotor Control Device According to Third Embodiment

In a third embodiment, rigidity data is mutually shared with other devices, a trend for aging (change) in rigidity is derived based on the rigidity data of other devices having many operating hours, for example, and the remaining operable amount of the connection mechanism 60 is estimated based on this trend and the magnitude of the current rigidity of its own device.

FIG. 10 is a view showing the configuration of a servomotor control device according to the third embodiment of the present invention. A servomotor control device 1C according to the third embodiment shown in FIG. 10 differs from the first embodiment in the point of including a motor control unit 10C in place of the motor control unit 10A of the servomotor control device 1A shown in FIG. 2. In addition, the motor control unit 10C differs from the first embodiment in the point of including an operating amount estimation section 28C in place of the deterioration detection section 28A of the motor control unit 10A shown in FIG. 2. It should be noted that the servomotor control device 1C and motor control unit 10C are examples of the servomotor control device 1 and motor control unit 10 of FIG. 1.

The storage section 24 stores rigidity data in which a plurality of magnitudes of rigidity every predetermined time interval or indefinite time interval of another device 1 and the operating amount at this time are associated.

The operating amount estimation section 28C derives the trend for aging (change) in rigidity based on the rigidity data of another device stored in the storage section 24, and estimates the remaining operable amount of the connection mechanism 60 until the magnitude of rigidity declines to no more than the threshold, based on the derived trend for aging (change) in rigidity and the rigidity data of its own device.

The display section 30 displays information indicating the remaining operable amount of the connection mechanism 60 estimated by the operating amount estimation section 28C.

Figure 13:
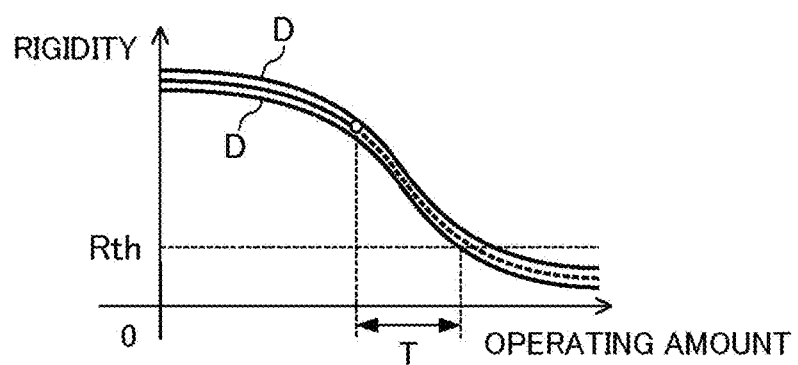
FIG. 13 is a view showing the relationship between rigidity and operating amount, i.e. trend for aging in rigidity.

Next, the rigidity estimation operation for the connection mechanism 60, the rigidity data sharing operation and the operating amount estimation operation by the servomotor control device 1C of the third embodiment will be explained by referencing FIGS. 8, and 11 to 13. FIG. 11 is a flowchart showing the rigidity data sharing operation by the servomotor control device 1C of the third embodiment, and FIG. 12 is a flowchart showing the operating amount estimation operation of the connection mechanism 60 by the servomotor control device 1C of the third embodiment. FIG. 13 is a graph showing the relationship between rigidity and operating amount, i.e. trend for aging of rigidity.

Rigidity Estimation Operation

Rigidity estimation operation is performed also by the servomotor control device 1C of the present embodiment similarly to the aforementioned FIG. 8. Rigidity data in which a plurality of magnitudes of rigidity of its own device estimated at every predetermined time interval or indefinite time interval and the operating amounts are associated is thereby stored in the storage section 24.

Rigidity Data Sharing Operation

First, in Step S41 of FIG. 11, the rigidity data of its own device stored in the storage section 24 is sent to another device via the network 6 by the communication section 26. In addition, in Step S42, the rigidity data of another device 1 in which a plurality of magnitudes of rigidity at every predetermined time interval or indefinite time interval and the operating amount are associated is acquired via the network 6 from the other device 1 by way of the communication section 26. Then, in Step S43, the acquired rigidity data of the other device 1 is stored in the storage section 24.

Operating Amount Estimation Operation

In Step S51 of FIG. 12, the operating amount estimation section 28C derives a trend D for aging (change) in rigidity as shown in FIG. 13, based on the rigidity data of the other device 1 stored in the storage section 24.

Next, in Step S52, the operating amount estimation section 28C estimates a remaining operable amount T of the connection mechanism 60 until the magnitude of rigidity declines to no more than the threshold Rth as shown in FIG. 13, based on the derived trend D for aging (change) in rigidity and the rigidity data of its own device stored in the storage section 24.

Next, in Step S53, the display section 30 displays information indicating the remaining operable amount of the connection mechanism 60 estimated by the operating amount estimation section 28C.

Also with the servomotor control device 1C of the present embodiment, the rigidity estimation section 22 gradually increases the constant for correction of the correction amount generation section 21 in a state suspending the generation of the position command value, whereby it can estimate the magnitude of rigidity of the connection mechanism 60, based on the constant for correction when the variation position occurs in the behavior of the rotation position of the servomotor 50.

In addition, with the servomotor control device 1C of the present embodiment, the operating amount estimation section 28C derives the trend for aging (change) in rigidity based on the rigidity data of another device, and estimates the remaining operable amount of the connection mechanism until the magnitude of rigidity declines to no more than a predetermined second threshold based on the derived trend for aging (change) in rigidity and the rigidity data of its own device; therefore, it is possible to confirm the existence of the necessity for maintenance of the connection mechanism 60 and the operating amount until maintenance becomes necessary.

In addition, with the servomotor control device 1C of the present embodiment, since the display section 30 displays information indicating the remaining operable amount of the connection mechanism 60, a user can confirm the existence of the necessity for maintenance of the connection mechanism 60 and the operating amount until maintenance becomes necessary.

It should be noted that, although the servomotor control device 1C of the present embodiment derives the trend for aging (change) in rigidity based on the rigidity data of another device, it may store trend data indicating the trend for aging (change) in rigidity measured in advance in the storage section 24. In this case, the operating amount estimation section 28C may estimate the remaining operable amount of the connection mechanism 60, based on the trend for aging (change) in rigidity indicated by this trend data and the rigidity data of its own device. In this form, it is possible to estimate the remaining operable amount even if not connected to a network. In this case, the motor control unit 10C of the servomotor control device 1C does not need to include the communication section 26 shown in FIG. 10.

In addition, with the servomotor control device 1C of the present embodiment, the rigidity data of its own device may also be stored in the storage section 5 of the external server device 4. In this case, in the rigidity estimation operation of FIG. 8, the rigidity data of its own device in which a plurality of magnitudes of rigidity estimated by the rigidity estimation section 22 at every predetermined time interval or indefinite time interval and the operating amounts are associated is sent to the storage section 5 of the server device 4 via a network 6 by way of the communication section 26, and is stored in the storage section 5. Then, in the operating amount estimation operation of FIG. 12, the rigidity data of its own device and the rigidity data of another device are acquired via a network by the communication section 26, and the operating amount estimation section 28C derives a trend for aging (change) in rigidity based on the acquired rigidity data of another device, and estimates the remaining operable amount of the connection mechanism 60 based on the derived trend for aging (change) in rigidity and the acquired rigidity data of its own device.

Although embodiments of the present invention have been explained above, the present invention is not to be limited to the aforementioned embodiments. In addition, the effects described in the present embodiment are merely exemplifying the most preferred effects produced from the present invention, and the effects according to the present invention are not limited to those described in the present embodiment.

For example, the aforementioned embodiments may be modified as appropriate, and may be realized by being combined. For example, the first embodiment and second embodiment may be combined so that, in the case of the magnitude of the current rigidity being larger than the threshold, the aging (change) in rigidity and variation are detected and displayed, and in the case of the magnitude of the current rigidity having declined to no more than the threshold, the deterioration in rigidity is detected and displayed. In addition, the first embodiment and the third embodiment may be combined so that, in the case of the magnitude of the current rigidity being greater than the threshold, the remaining operable amount is estimated and displayed, and in the case of the magnitude of the current rigidity having declined to no more than the threshold, the deterioration in rigidity is detected and displayed.

In addition, in the aforementioned embodiments, a display section is exemplified as an example of a notification section; however, the notification section is not limited thereto. For example, the notification section may be a light emitting part such as one or a plurality of LEDs. In the case of being one LED, different information may be notified by way of illuminating, flashing, and the like. In addition, in the case of being a plurality of LEDs, different information may be notified by way of the number illuminated of the same color, or different colors. In addition, for example, the notification section may be a sound generating unit such as for a buzzer sound or voice.

In addition, with the aforementioned embodiment, the rigidity estimation section 22 automatically detects the variation point in behavior of the rotation position of the servomotor 50 (or estimated drive torque, or correction amount) based on predetermined conditions; however, it may detect manually. For example, it may display the behavior of the rotation position of the servomotor 50 (or estimated drive torque, or correction amount) on a monitor or the like, the matter of the variation point occurring in the behavior of the rotation position of the servomotor 50 (or estimated drive torque, or correction amount) may be detected visually, and the constant for correction at this time may be manually inputted to the motor control units 10A to 10C.

EXPLANATION OF REFERENCE NUMERALS 1, 1A, 1E, 1C servomotor control device
4 servo device
5 storage section
6 network
10, 10A, 10B, 10C motor control unit
12 position command generation section
13, 15 subtracter
14 speed command generation section
16 torque command generation section
17 adder
20 force estimation section
21 correction amount generation section
22 rigidity estimation section
24 storage section
26 communication section
28A deterioration detection section
28B rigidity variation detection section
28C operating amount estimation section
30 display section (notification section)
40 encoder
50 servomotor
60 connection mechanism
61 coupling
62 ball screw
63 nut
70 table (driven body)
100 servomotor control system

What is claimed is:

1. A servomotor control device, comprising:
a servomotor;
a detection unit that detects a rotation position of the servomotor;
a driven body that is driven by the servomotor;
a connection mechanism that connects the servomotor and the driven body to transmit power of the servomotor to the driven body; and
a motor control unit that controls the servomotor based on a position command value,
wherein the motor control unit includes:
a force estimation section that estimates a drive force acting on the driven body at a connection part between the connection mechanism and the driven body;
a correction amount generation section that generates a correction amount for correcting the position command value, based on the drive force estimated by the force estimation section and a constant for correction; and
a rigidity estimation section that gradually increases the constant for correction of the correction amount generation section in a state suspending generation of the position command value, and estimates a magnitude of rigidity of the connection mechanism based on the constant for correction when a variation point occurs in behavior of rotation position information of the servomotor detected by the detection unit, drive force estimated by the force estimation section, or correction amount generated by the correction amount generation section.

2. The servomotor control device according to claim 1, wherein the rigidity estimation section defines a time when a local maximum appears in the behavior of the rotation position information of the servomotor detected by the detection unit, the drive force estimated by the force estimation section, or the correction amount generated by the correction amount generation section, as the variation point.

3. The servomotor control device according to claim 1, wherein the rigidity estimation section:
defines when a local maximum appears in the behavior of the rotation position information of the servomotor detected by the detection unit, the drive force estimated by the force estimation section, or the correction amount generated by the correction amount generation section, and a difference between the local maximum and a value during change in the constant for correction becomes at least a predetermined value, or a predetermined multiple of a difference between the value during change in the constant for correction and a convergence value after change in the constant for correction, as the variation point; or defines when a local maximum appears in the behavior of the rotation position information of the servomotor detected by the detection unit, drive force estimated by the force estimation section, or correction amount generated by the correction amount generation section, and a difference between the local maximum and a value during change in the constant for correction becomes at least a predetermined value, as the variation point.

4. The servomotor control device according to claim 1, wherein the behavior is a change with elapse of time.

5. The servomotor control device according to claim 1, wherein the motor control unit further includes a deterioration detection section that detects deterioration of the connection mechanism based on the magnitude of rigidity estimated by the rigidity estimation section.

6. The servomotor control device according to claim 5, wherein the deterioration detection section detects deterioration of the connection mechanism, when the magnitude of rigidity estimated by the rigidity estimation section has declined to no more than a predetermined first threshold.

7. The servomotor control device according to claim 1, wherein the motor control unit further includes:
 a storage section that stores a plurality of magnitudes of rigidity estimated by the rigidity estimation section at every predetermined time interval or indefinite time interval, as rigidity data; and
 a rigidity variation detection section that detects a change and variation in the rigidity of the connection mechanism, based on the rigidity data stored in the storage section.

8. The servomotor control device according to claim 1, wherein the motor control unit further includes:
 a communication section that performs communication with another servomotor control device;
 a storage section that stores rigidity data of its own device in which a plurality of magnitudes of rigidity of its own device estimated by the rigidity estimation section at every predetermined time interval or indefinite time interval and operating amounts are associated, and stores rigidity data of another device, in which a plurality of magnitudes of rigidity of another device at every predetermined time interval or indefinite time internal and operating amounts are associated, acquired by the communication section; and
 an operating amount estimation section that derives a trend for change in rigidity based on the rigidity data of another device stored in the storage section, and estimates a remaining operable amount of the connection mechanism until the magnitude of rigidity declines to no more than a predetermined second threshold, based on the trend for change in rigidity thus derived, and the rigidity data of its own device stored in the storage section.

9. The servomotor control device according to claim 1, wherein the motor control unit further includes:
 a storage section that stores rigidity data of its own device in which a plurality of magnitudes of rigidity of its own device estimated by the rigidity estimation section at every predetermined time interval or indefinite time interval and operating amounts are associated, and stores in advance trend data indicating a trend for change in rigidity of the connection mechanism; and
 an operating amount estimation section that estimates a remaining operable amount of the connection mechanism until the magnitude of rigidity declines to no more than a predetermined second threshold, based on the trend for change in rigidity indicated by the trend data stored in the storage section, and the rigidity data of its own device stored in the storage section.

10. The servomotor control device according to claim 5, wherein the motor control unit further includes a notification section that notifies of information indicating the deterioration detected by the deterioration detection section.

11. The servomotor control device according to claim 7, wherein the motor control unit further includes a notification section that notifies of information indicating at least one of the change and variation in rigidity detected by the rigidity variation detection section.

12. The servomotor control device according to claim 8, wherein the motor control unit further includes a notification section that notifies information indicating the operable amount estimated by the operating amount estimation section.

13. The servomotor control device according to claim 10, wherein the notification section is a display device that displays information.

14. The servomotor control device according to claim 1, wherein the motor control unit further includes:
 a communication section that sends a plurality of magnitudes of rigidity estimated by the rigidity estimation section at every predetermined time interval or indefinite time interval as rigidity data to an external storage section, and acquires the rigidity data stored in the external storage section; and
 a rigidity variation detection section that detects a change and variation in rigidity of the connection mechanism, based on the rigidity data acquired by the communication section from the external storage section.

15. The servomotor control device according to claim 1, wherein the motor control unit further includes:
 a communication section that sends rigidity data of its own device, in which a plurality of magnitudes of rigidity of its own device estimated by the rigidity estimation section at every predetermined time interval or indefinite time interval and operating amounts are associated, to an external storage section, and acquires the rigidity data of its own device and rigidity data of another device, in which a plurality of magnitudes of rigidity at every predetermined time interval or indefinite time interval and operating amounts are associated, stored in the external storage section; and
 an operating amount estimation section that derives a trend for change in rigidity based on the rigidity data of another device acquired by the communication section from the external storage section, and estimates a remaining operable amount of the connection mechanism until the magnitude of rigidity declines to no more than a predetermined second threshold, based on the trend for change in rigidity thus derived and the rigidity data of its own device acquired by the communication section from the external storage section.

16. A servomotor control system comprising:
 the servomotor control device according to claim 14; and
 a server device that is connected to the servomotor control device and includes the external storage section.

* * * * *